US00RE49264E

(19) United States
(12) Reissued Patent
Baker et al.

(10) Patent Number: US RE49,264 E
(45) Date of Reissued Patent: Nov. 1, 2022

(54) DISPLAY SCREEN OR PORTION THEREOF WITH GRAPHICAL USER INTERFACE

(71) Applicant: Lutron Technology Company LLC, Coopersburg, PA (US)

(72) Inventors: Rhodes B. Baker, Bethlehem, PA (US); Erica L. Clymer, Northampton, PA (US); Benjamin F. Bard, Zionsville, PA (US)

(73) Assignee: Lutron Technology Company LLC, Coopersburg, PA (US)

(21) Appl. No.: 29/778,455

(22) Filed: Apr. 13, 2021

Related U.S. Patent Documents

Reissue of:
(64) Patent No.: Des. 772,910
Issued: Nov. 29, 2016
Appl. No.: 29/519,785
Filed: Mar. 8, 2015

U.S. Applications:
(63) Continuation of application No. 29/671,750, filed on Nov. 29, 2018, now Pat. No. Re. 48,567, which is an application for the reissue of Pat. No. Des. 772,910.

(51) LOC (13) Cl. ..... 14-04
(52) U.S. Cl.
USPC ..... D14/486
(58) Field of Classification Search
USPC ..... D14/485–495; D18/26, 31, 32, 33; D20/11, 12, 23, 24, 25, 29, 30, 31, 32, D20/36, 37, 38

(Continued)

(56) References Cited

U.S. PATENT DOCUMENTS

D546,779 S * 7/2007 Mierta ..... D13/164
D592,225 S * 5/2009 Blankenship ..... D14/492

(Continued)

OTHER PUBLICATIONS

Lutron's Caseta lighting controls are now (mostly) compatible with Apple's HomeKit, by Michael Brown, dated Jun. 2, 2015, TechHive.com. [online], [retrieved Feb. 6, 2017]. Available from internet: <URL:http://www.techhive.com/article/2929733/lutrons-caseta-lighting-controls-are-now-mostly-compatible-with-apples-homekit.html>.

(Continued)

*Primary Examiner* — Darlington Ly
(74) *Attorney, Agent, or Firm* — Saidman DesignLaw Group, LLC

(57) CLAIM

The ornamental design for a display screen or portion thereof with graphical user interface, as shown and described.

DESCRIPTION

*This application is a continuation reissue of U.S. application Ser. No. 29/671,750, which is an application for reissue of U.S. Pat. No. D. 772,910, which issued from application Ser. No. 29/519,785, the entireties of which are expressly incorporated herein by reference.*

The sole FIGURE is a display screen or portion thereof with graphical user interface showing our new design.

The peripheral dashed broken lines [represent] *illustrate* a display screen or portion thereof which forms no part of the claimed design.

*The interior broken lines illustrate portions of the graphical user interlace which form no part of the claimed design.*

*The relatively faded gray illustrates portions or elements of the graphical user interface which form no part of the claimed design.*

1 Claim, 1 Drawing Sheet

Matter enclosed in heavy brackets [ ] appears in the original patent but forms no part of this reissue; matter printed in italics indicates the additions made by reissue.

(NEW)

(58) Field of Classification Search
CPC ..... G06F 3/048; G06F 3/0481; G06F 3/0482; G06F 3/04817; G06F 3/04812
See application file for complete search history.

(56) References Cited

U.S. PATENT DOCUMENTS

| | | | | |
|---|---|---|---|---|
| 7,587,683 | B2 * | 9/2009 | Ito | H04M 1/72469 715/857 |
| D611,950 | S * | 3/2010 | Fletcher | D14/488 |
| D624,556 | S * | 9/2010 | Chaudhri | D14/486 |
| D640,267 | S | 6/2011 | Jones et al. | |
| D649,125 | S * | 11/2011 | Clymer | D13/174 |
| D659,158 | S * | 5/2012 | Clymer | D14/488 |
| D660,310 | S * | 5/2012 | Kim | D14/486 |
| D687,050 | S * | 7/2013 | Matas | D14/486 |
| D695,758 | S * | 12/2013 | Tagliabue | D14/486 |
| D696,272 | S * | 12/2013 | Tagliabue | D14/486 |
| D702,700 | S * | 4/2014 | Thompson | D14/492 |
| 8,780,201 | B1 * | 7/2014 | Scalisi | H04N 7/186 348/143 |
| 8,866,343 | B2 * | 10/2014 | Abraham | H04L 12/413 307/85 |
| D737,283 | S * | 8/2015 | Scalisi | D14/485 |
| D746,849 | S * | 1/2016 | Anzures | D14/486 |
| D757,802 | S * | 5/2016 | Kim | D14/491 |
| D760,737 | S * | 7/2016 | Yoon | D14/485 |
| D761,292 | S * | 7/2016 | Wiesner | D14/486 |
| 9,384,491 | B1 * | 7/2016 | Briggs | H04W 4/44 |
| D766,289 | S | 9/2016 | Bauer et al. | |
| D773,485 | S | 12/2016 | Cho et al. | |
| D780,793 | S * | 3/2017 | Lemay | D14/486 |
| D794,669 | S | 8/2017 | Baker et al. | |
| D800,740 | S | 10/2017 | Clymer et al. | |
| D801,365 | S * | 10/2017 | Broughton | D14/486 |
| D802,013 | S * | 11/2017 | Kluge | D14/488 |
| D830,409 | S * | 10/2018 | Agarwal | D14/488 |
| D847,174 | S * | 4/2019 | Agarwal | D14/486 |
| D849,050 | S | 5/2019 | Clymer et al. | |
| D854,036 | S * | 7/2019 | Agarwal | D14/486 |
| D866,588 | S * | 11/2019 | Agarwal | D14/492 |
| D873,847 | S * | 1/2020 | Clymer | D14/487 |
| D876,456 | S * | 2/2020 | Broughton | D14/491 |
| 2006/0019053 | A1 | 1/2006 | Jacoby et al. | |
| 2010/0023865 | A1 * | 1/2010 | Fulker | G08B 25/14 700/286 |
| 2011/0266122 | A1 | 11/2011 | Zaharchuk et al. | H01H 9/18 200/308 |
| 2012/0095601 | A1 | 4/2012 | Abraham et al. | |
| 2014/0236358 | A1 | 8/2014 | Sasaki et al. | |
| 2014/0380234 | A1 * | 12/2014 | Shim | G06F 3/04842 715/781 |
| 2015/0033136 | A1 * | 1/2015 | Sasaki | H04L 41/22 715/736 |
| 2015/0188724 | A1 * | 7/2015 | Kim | H04M 1/72415 340/3.71 |
| 2015/0286388 | A1 * | 10/2015 | Jeon | G06F 3/048 715/736 |
| 2016/0262235 | A1 | 9/2016 | Clymer et al. | |

OTHER PUBLICATIONS

Lutron Electronics Co., Inc., Icons from HomeControl+ (Q3 2014) App, available at least as early as Aug. 4, 2015.
Lutron Electronics Co., Inc, Icons from Quantum Vue (Q1 2014) App, available at least as early as Aug. 4, 2015.
Lutron Electronics Co., Inc., Icons from Caseta (Q2 2014) App, available at least as early as Aug. 4, 2015.
Lutron Electronics Co., Inc., Icons from Apple Watch (Q3 2014) App, available at least as early as Aug. 4, 2015.
Lutron Electronics Co., Inc., Icons from Lutron Connect (Apr. 2016) App, available at least as early as Aug. 4, 2015.
Lutron Electronics Co., Inc., Icons from Vive (Q3 2016) App, available at least as early as Aug. 4, 2015.
Lutron Technical Support, RadioRA2—Lutron Home Control+ App for the Apple iPad, iPhone, and iPod touch, Revision F, available at least as early as 2010.
Lutron Technical Support, RadioRA2—Lutron Home Control+ App for the Apple iPad, iPhone, and iPod touch, Lutron Home Control+ App for Android, Revision I, available at least as early as 2011.
U.S. Appl. No. 29/735,507, filed May 21, 2020 (unpublished).
Crestron Electronics Inc., Crestron Mobile E-Control Mobility Solution, available at least as early as Mar. 2009.
Crestron Electronics Inc., Prodigy System User Guide, available at least as early as Mar. 8, 2015.
Crestron Electronics Inc., Prodigy System User Guide Crestron $PTX_3$, available at least as early as Mar. 8, 2015.
Julie Jacobson, CEPro $Control_4$ InfinityEdge Priced, Designed Like iPad, <http://www.cepro.com/article/control4_infinityedge_priced_designed_like_ipad/ >, available on Aug. 10, 2010.
Lutron Technical Support, $RadioRA_2$—Lutron Home Control+ App for the Apple iPad, iPhone, and iPod touch, Revision F, available at least as early as Mar. 8, 2015.
Lutron Electronics Co., Inc. Quantum Green Glance Brochure, available at least as early as Nov. 2007.
Home Automation, Inc., OmniTouch 5.7 Touchscreen with Video User's Guide, available at least as early as Jun. 2007.
Crestron Electronics Inc., Prodigy Brochure, available at least as early as Mar. 8, 2015.

* cited by examiner

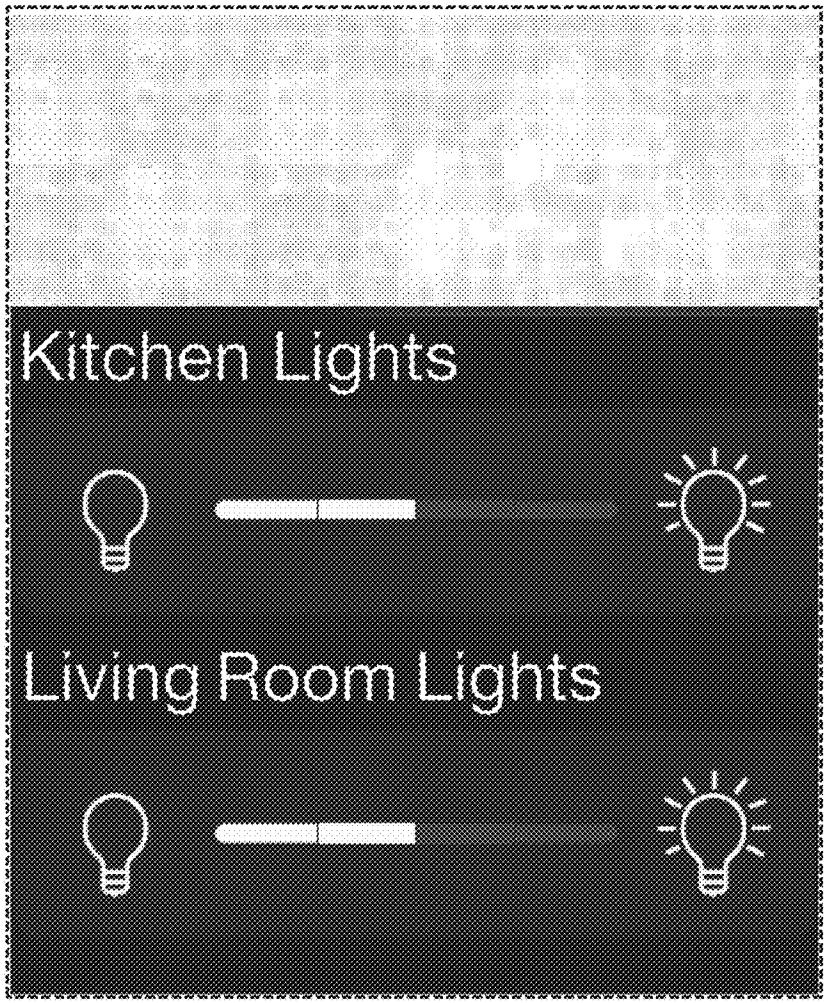
*(NEW)*